(12) United States Patent
Sakamaki et al.

(10) Patent No.: US 6,651,534 B1
(45) Date of Patent: Nov. 25, 2003

(54) NC CIRCULAR TABLE AND NC CIRCULAR TABLE APPARATUS

(75) Inventors: Kazuo Sakamaki, Ojiya (JP); Akira Sakamaki, Ojiya (JP); Kiyohiro Kinefuchi, Ojiya (JP)

(73) Assignee: Yukiwa Seiko Kabushiki Kaisha, Ojiya (JP)

( * ) Notice: Subject to any disclaimer, the term of this patent is extended or adjusted under 35 U.S.C. 154(b) by 0 days.

(21) Appl. No.: 09/573,878

(22) Filed: May 19, 2000

(30) Foreign Application Priority Data

Aug. 3, 1999 (JP) .......................................... 11-219714

(51) Int. Cl.[7] .............................. B23B 7/00; B23B 9/00
(52) U.S. Cl. ............................ 82/118; 82/134; 82/173; 318/561
(58) Field of Search ......................... 82/118, 120, 121, 82/134, 129, 173; 340/636; 318/561, 578

(56) References Cited

U.S. PATENT DOCUMENTS

| | | | | |
|---|---|---|---|---|
| 4,469,993 A | * | 9/1984 | Swanson et al. ............ 318/561 |
| 4,964,065 A | * | 10/1990 | Hicks et al. ................ 709/226 |
| 4,989,261 A | * | 1/1991 | Lee ............................ 455/127 |
| 5,059,879 A | * | 10/1991 | Watanabe .................... 318/603 |
| 5,212,645 A | * | 5/1993 | Wildes et al. ............... 700/108 |
| 5,530,331 A | * | 6/1996 | Hanei ......................... 318/592 |
| 5,619,111 A | * | 4/1997 | Katagiri et al. ............. 318/625 |
| 5,767,649 A | * | 6/1998 | Arimoto et al. ............ 318/578 |
| 6,072,305 A | * | 6/2000 | Trainor et al. .............. 323/255 |

FOREIGN PATENT DOCUMENTS

JP        4-99912        *  3/1992 ............... 341/13 X

* cited by examiner

*Primary Examiner*—Henry W. H. Tsai
(74) *Attorney, Agent, or Firm*—Conolly Bove Lodge & Hutz LLP; Larry J. Hume (57) ABSTRACT

An NC machine tool includes an NC circular table and an NC circular table apparatus which dispense with the original restoration or calibration operation in an absolute type encoder using a backup battery. The NC circular table has an NC controller for performing a positional detection by an absolute type encoder and a backup battery for the encoder is provided in the NC circular table body.

15 Claims, 5 Drawing Sheets

NC CIRCULAR TABLE AND NC CIRCULAR TABLE APPARATUS

BACKGROUND OF THE INVENTION

The present invention relates to a circular table for NC control table laid on a table of NC machine tool for performing a rotating or indexing operation of workpiece (hereinafter referred to as an NC circular table) and ail NC circular table apparatus.

Figure 1:
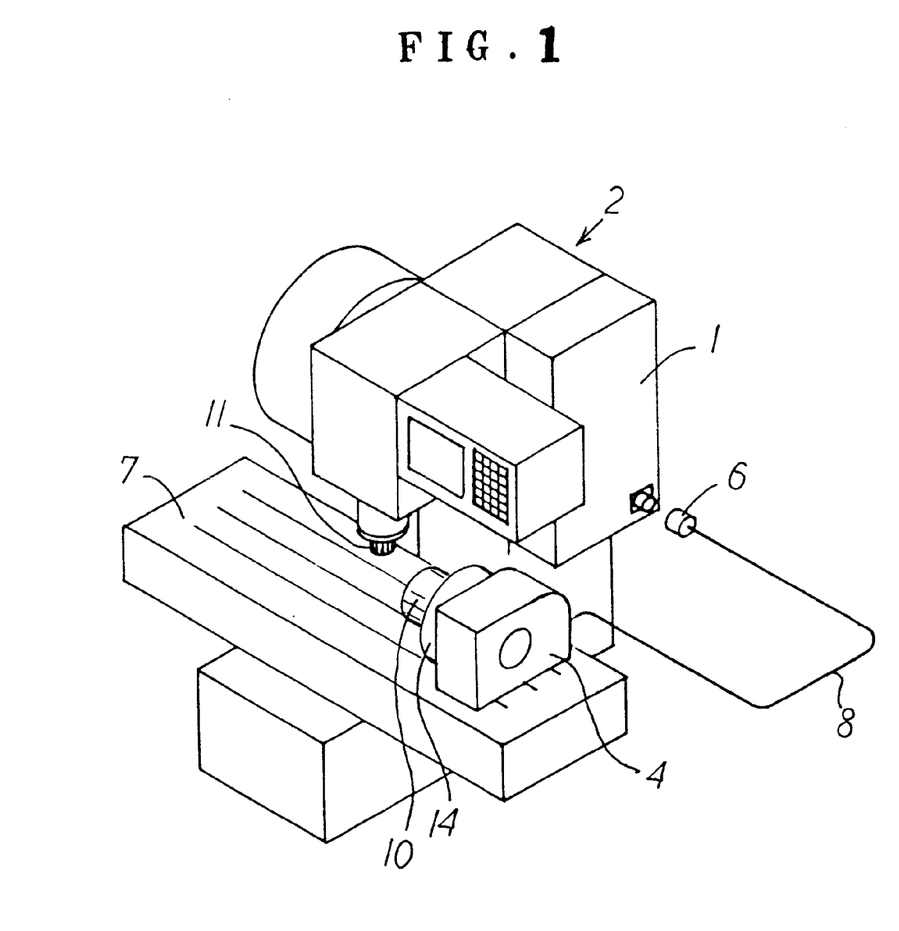
FIG. 1 is a perspective view showing a general NC machine tool.

FIG. 1 shows an example of an NC machine tool 2. The NC machine tool 2 has an NC controller 1. An NC circular table body 4 is laid on a table 7 of the NC machine tool 2. A connector 6 of a cable 8 provided on the NC circular table body 4 is connected to the NC controller 1. Incidentally, the same reference numerals are used to indicate the like members or components through the specification.

Also, the NC circular table body 4 is provided with a servo motor 9 for rotating a rotary table 14 on which the workpiece 10 is to be mounted and an encoder 3 for detecting a position for controlling the rotation of the rotary table 14. The encoder 3 is connected to the NC controller 1 through the above-described cable 8 and connector 6 and is controlled by a program installed in the NC controller 1.

By the way, encoders 3 are categorized into incremental type ones and absolute type ones.

In the incremental type encoder 3, when the power source is cut off, the current position (angular position of the rotary table 14) of the workpiece 10 is unknown. Accordingly, it is necessary to perform the original restoration work when a power stop caused by lightning or the like. Thus, this type encoder suffers from the problem that it takes a long time for the restoration.

On the other hand, the absolute type encoders 3 are subclassified into a mechanical system for storing the current position or the original position by a mechanical means such as a gear (hereinafter referred to a mechanical type) and a backup battery system for storing the current position or the original position in terms of absolute positions by a backup battery (hereinafter referred to a backup battery type). Thus, the absolute type encoders 3 have a merit that the original restoration work may be dispensed with even if the power source is cut off. However, the mechanical type encoders 3 suffer from the problem that the entire system is large in size and complication in structure. Therefore, in general, the backup battery type encoder that may miniaturize the overall system has been extensively used.

Figure 2:
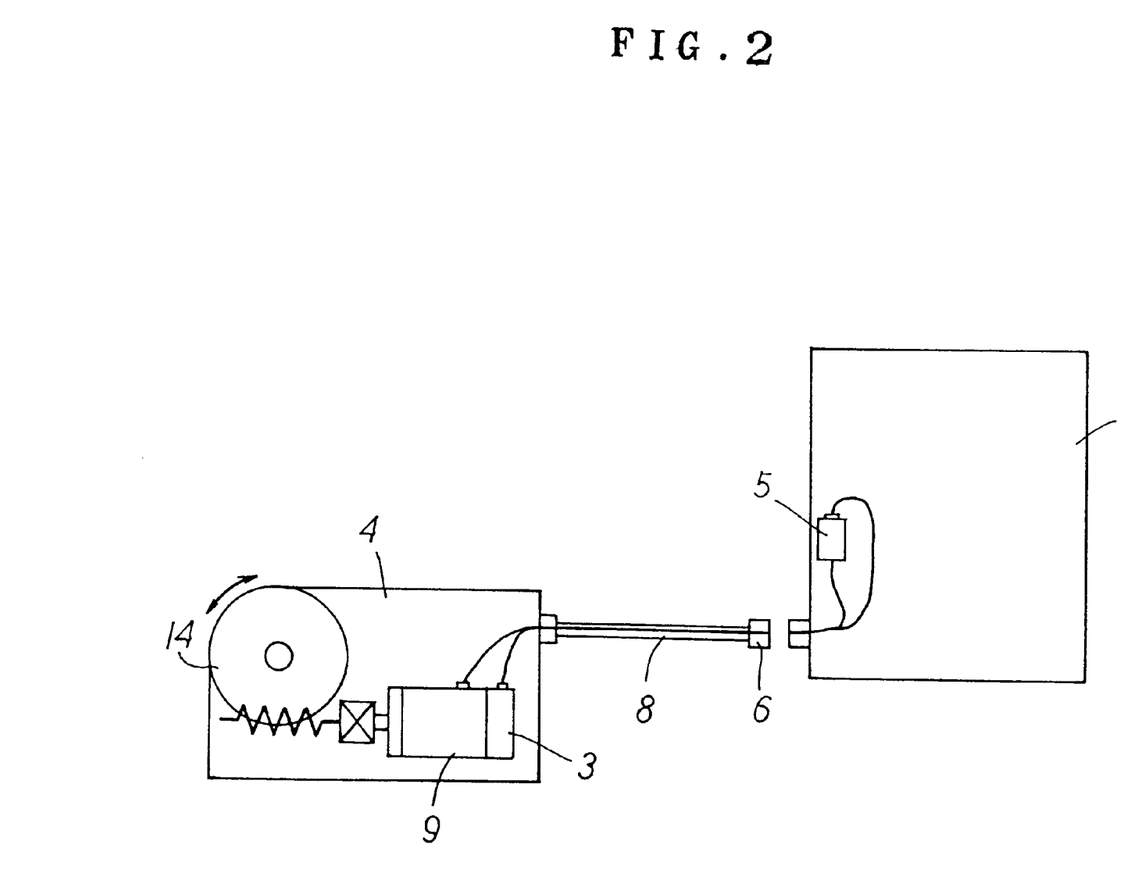
FIG. 2 is an illustration of an conventional example.

However, in case of the conventional backup battery type encoder, in the above-described NC machine tool 2, as shown in FIG. 2, the backup battery 5 of the encoder 3 is provided within the NC controller 1. Thus, this system has the following disadvantages.

In general, the NC circular table body 4 is separated from the NC controller 1 upon the delivery from the factory until it is installed at the working field. Also, even after the installing of the NC circular table body 4 at the working field, there is a necessity that the NC circular table body 4 be dismounted from the NC machine tool 2 and separated away from the NC controller 1, for example, due to the change of the workpieces 10. Also, in the case where a plurality of NC circular table bodies 4 and a plurality of NC machine tools 2 are used in combination, there is a possibility that the combination of the NC circular table body 4 and the NC machine tool 2 is changed. In these cases, the encoder 3 of the NC circular table body 4 is not supplied with electric power from the power source by the backup battery 5 within the NC controller 1 so that the original position or the current position becomes unknown. Thus, even if the system is of the absolute type, it is necessary to carry out the original restoration work, disadvantageously.

SUMMARY OF THE INVENTION

An object of the present invention is to provide an NC circular table and an NC circular table apparatus that are superior in practical use and workability to dispense with the original restoration operation in an absolute type encoder using a backup battery.

According to the present invention, an NC circular table is used to an NC machine tool having an NC controller for performing a positional detection by an absolute type encoder, and a backup battery for the encoder is provided to an NC circular table body.

Also, an NC circular table used to an NC machine tool having an NC controller for performing a positional detection by an absolute type encoder is characterized in a backup battery for the encoder is provided inside or outside of at least one of an NC circular table body, a cable connected to the NC circular table body and a connector connected to said NC circular table body.

Also, in the NC circular table according to the first aspect of the invention, a connector that may connect the encoder detachably to the NC controller is provided in the NC circular table body.

Also, in the NC circular table according to either first aspect or second aspect, the NC circular table body is detachable from the NC controller.

Also, an NC circular table used to an NC machine tool having an NC controller for performing a positional detection by an absolute type encoder to which a backup battery is connected, and in which the NC controller and a cable connected to an NC circular table body are detachable away from each other, is characterized in that a backup battery for the encoder is provided inside or outside of at least one of the NC circular table body, the cable connected to the NC circular table body and a connector connected to the NC circular table body, and the electric supply from the backup battery to the encoder is not interrupted by the separation between the NC controller and the cable connected to the NC circular table body.

Also, an NC circular table apparatus used to an NC machine tool having an NC controller for performing a positional detection by an absolute type encoder, comprises an NC circular table to which a cable for connecting the NC controller and an NC circular table body with each other is detachable, and a backup battery device provided with a backup battery connected to the NC circular table body for feeding electricity to the encoder of the NC circular table body when the cable that has connected the NC controller and the NC circular table body with each other is removed.

Also, in this case, in the NC circular table apparatus, the backup battery device is connectable to at least one of a connector for connection with the cable provided to the NC circular table body and a connector of the cable connected to the NC circular table body.

Since the data such as an original position or a current position within the encoder are preserved by the backup battery provided in the NC circular table body, it is unnecessary to perform the original restoration operation even if the separation and reconnection of the NC circular table body and the NC controller. Again, it is possible to perform the machining work of the workpiece by the NC circular table body.

Also, for instance, in the case where the NC controller and the NC circular table body are connected to each other through the detachable cable, even if the NC controller and the NC circular table body are separated apart from each other, the electric supply is ensured by a capacitor or the like within the encoder to back up the data such as an original position or a current position within the encoder for a while. In the meanwhile, the backup battery device is connected to the NC circular table body and the electricity is fed from the backup battery provided in the backup battery device to the encoder of the NC circular table body so that the data such as an original portion or a current position within the encoder may be preserved continuously.

With such an arrangement, as described above, it is possible to provide an NC circular table and an NC circular table apparatus that are superior in practical use or workability that may dispense with the original restoration operation.

DESCRIPTION OF THE PREFERRED EMBODIMENTS

Figure 3:
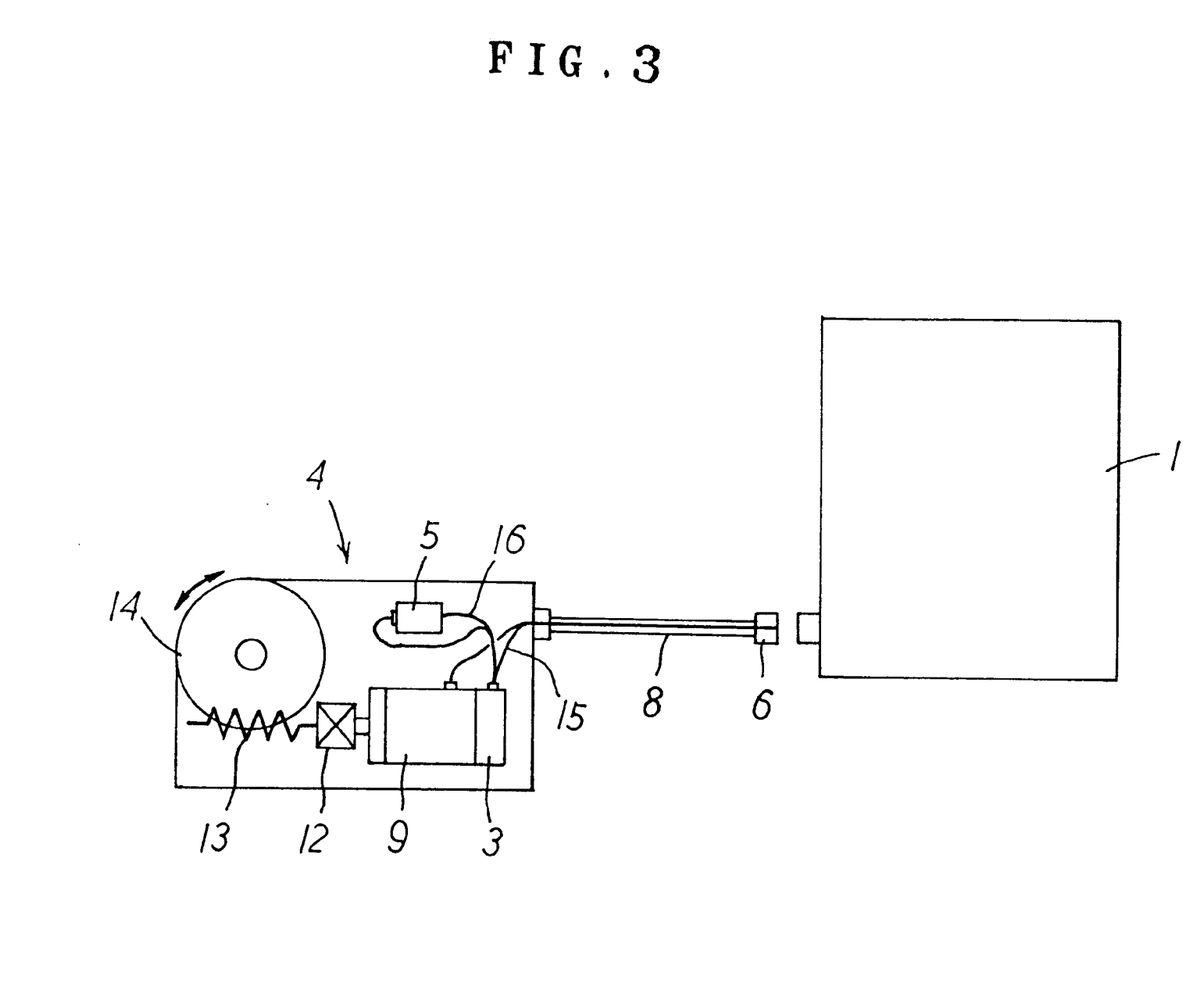
FIG. 3 is an illustration of a first embodiment.
Figure 4:
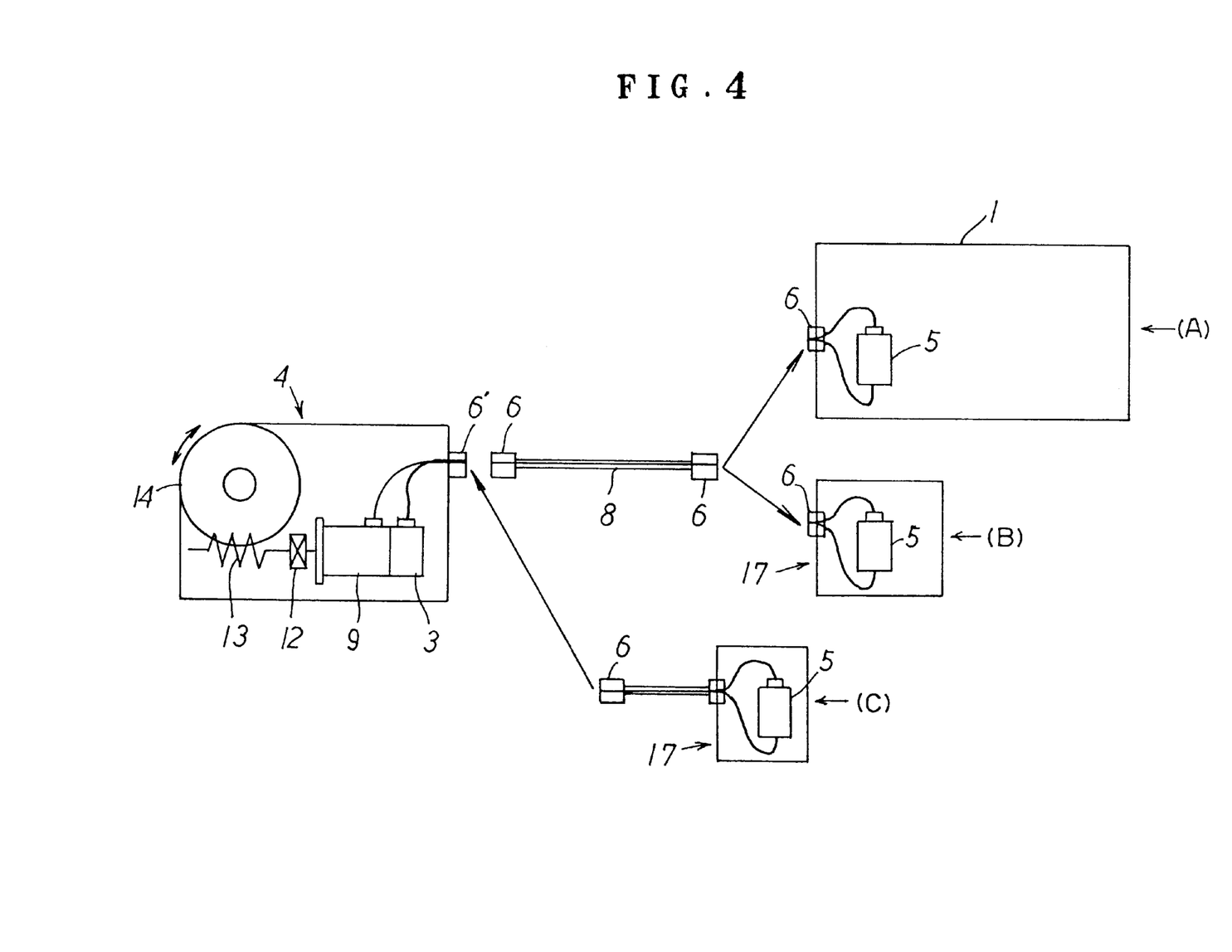
FIG. 4 is an illustration of a second embodiment.

The present invention will now be described with reference to the accompanying drawings. FIGS. 1 and 3 shows a first embodiment of the invention and FIG. 4 shows a second embodiment of the invention.

In accordance with the first embodiment, there is provided an NC circular table which is used in an NC machine tool 2 having an NC controller 1 and which performs a positional detection by an encoder 3 that is of an absolute type, in which a backup battery 5 is provided for backing up the parameters of the encoder 3 to a NC circular table body 4.

The NC circular table body 4 is connected detachably to the NC controller 1 through a cable 8 and a connector 6 provided at a tip end of the cable 8 and is to be moved on a table 7 of the NC machine tool 2 by the NC control of the NC controller 1.

Incidentally, in addition to the system shown in the drawings in which the separation is effected by the connector 6 on the NC controller 1 side, it is possible to use, as the connection structure between the NC circular table body 4 and the NC controller 1, for example, a system in which the separation is effected on a connector on the NC circular table body 4 side, a system in which connectors are provided on both of the NC circular table body 4 and the NC controller 1 and both the connectors are connected through the cable, a system in which the separation is effected by a terminal base on the NC controller 1 side, or a system similar to these systems.

The NC circular table body 4 is provided with a rotary table 14 on which the workpiece 10 is mounted. The rotary table 14 is caused to rotate and the workpiece 10 mounted on the rotary table 14 is brought into a desired rotational condition to thereby perform the work of the workpiece 10 by a tool 11 (cutting tool or drill) of the machine tool 2. Also, it is possible to use an NC circular table body that may move the workpiece 10 back and forth and/or right and left. Incidentally, the "NC circular table body 4" according to the present invention includes a concept of the NC circular table and NC tilting table.

Also, the NC circular table body 4 is provided with a servo motor 9 for bring the rotary table into the desired rotational condition in accordance with the NC control from the NC controller 1 and the recognition of the current position and the original position of the encoder 3, and a joint 12 and a worm gear 13 for transmitting the rotation of the servo motor 9 to the rotary table 14.

Circuit lines 15 for transmitting the NC control from the NC controller 1 to the encoder 3 and the servo motor 9 are provided to the cable 8 and the connector 6.

Reference numeral 16 denotes a line for supplying the encoder 3 with electricity from the backup battery 5.

Also, the backup battery 5 shown in the drawings is provided within the NC circular table body 4. However, it is possible to provide the backup battery 5 inside or outside of the cable 8 or the connector 6 or outside of the NC circular table body 4. Also, a battery case including cover 5A and set screw 5B may be provided outside of the cable 8 (see FIG. 5A), or the connector 6' (see FIG. 5B), or outside of the NC circular table body 4, and the backup battery is provided within the battery case. Namely, the backup battery 5 may be provided in any place if the supply of the electricity to the encoder 3 is not interrupted when the NC circular table body 4 is separated from the NC controller 1.

With such an arrangement in accordance with the first embodiment, the parameters such as the original position or the current position stored in terms of the absolute positions to the encoder 3 are no longer lost by the backup battery 5 even during the period of the installation of the NC circular table body 4 at the working field from the delivery out of the factory or even if the connector 6 of the NC circular table body 4 is separated from and reconnected to the NC machine tool 2 due to the change of the workpiece 10 or the like reasons. The feature of the absolute type encoder 3 may be fully enjoyed. It is therefore possible to provide an NC circular table that is superior in practical use for making it possible to perform the working start or the working restart of the workpiece 10 by the positive positional detection.

Namely, in the conventional system, although the absolute type encoder 3 is used, the current position becomes unknown and it is necessary to perform the original restoration operation. In this case, it is necessary to use a dog and a switch for detecting the original position. However, according to the first embodiment, a dog and a switch may be dispensed with, and there is no fear of a damage or fault due to the failure of the dog or the breakdown of the switch. Also, after the installing of the NC circular table body 4, it is necessary to again reset the parameters that have been inputted in the encorder 3 when the NC circular table body 4 is delivered from the factory. However, according to the first embodiment, it is possible to dispense with this reset operation, and there is no fear that the parameters are erroneously set.

As described above, according to the first embodiment, since the original restoration operation may be dispensed with by the backup battery 5 provided on the NC circular table body 4, it is possible to provide an NC circular table that is superior in practical use and workability.

According to the second embodiment of the invention, an NC circular table apparatus is composed mainly of an NC circular table which is use to an NC machine tool 2 having an NC controller 1, and performs a positional detection by an absolute type encoder 3 and to which a cable 8 for connecting the NC controller 1 and the NC circular table body 4 with each other is detachably attached, and a backup battery device 17 which is connected to the NC circular table body 4 when the cable 8 for connecting the NC controller 1 and the NC circular table body 4 with each other is removed, and provided with a backup battery 5 for supplying the encoder 3 of the NC circular table body 4 with electricity.

Also, the backup power source device 17 may be connected to a connector 6' for connection with the cable 8 provided on the NC circular table body 4 or a connector 6 of the cable connected to the NC circular table body 4.

The cable 8 shown in FIG. 4 is detachably connected to both of the NC controller 1 and the NC circular table body 4 through the connectors 6. However, it is possible to modify this arrangement so that the cable 8 may be detachably connected to either one of the NC controller 1 and the NC circular table body 4.

In the NC machine tool 2, as shown in a part (A) of FIG. 4, the NC controller 1 and the NC circular table body 4 are connected with each other through the cable 8 during performing the work of the workpiece 10 so that the electricity is fed from the backup battery 5 provided in the NC controller 1 to the encoder 3 provided in the NC circular table body 4 to thereby preserve the parameters such as an original position or a current position stored in terms of absolute positions to the encoder 3.

Also, in the case where the connection between the NC controller 1 and the NC circular table body 4 through the cable 8 is released as in the case the installation position of the NC circular table body 4 is to be changed or the workpiece 10 is to be changed, the parameters such as an original position or a current position stored in terms of absolute positions to the encoder 3 by a capacitor or the like within the circuit of the encoder 3 may be preserved for several minutes.

Accordingly, if the electric supply is effected to the encoder 3 while the parameters of the encoder 3 are kept on being preserved, the parameters of the encoder 3 may be preserved.

More specifically:

i) in the case where the cable 8 is connected to the NC circular table body 4 without any change, as shown in a part (B) of FIG. 4, the backup battery device 17 is connected to the connector 6 of the cable 8 that has been connected to the NC controller 1, and ii) in the case where the cable 8 is separated apart from the NC circular table body 4, as shown in a part (C) of FIG. 4, the backup battery device 17 is connected to the connector 6' of the NC circular table body 4 that has been connected to the cable 8.

In any method described above, the electricity is fed from the backup battery 5 provided in the backup battery device 17 to the encoder 3 provided in the NC circular table body 4 and the parameters such as an original position or a current position stored in terms of absolute positions to the encoder 3 is preserved.

With such an arrangement in accordance with the second embodiment of the invention, even if the backup battery 5 could not be provided in the NC circular table body 4, it is possible to feed the electricity from the backup battery source 17 to the encoder 3 of the NC circular table body 4 and to provide an NC circular table apparatus that is superior in practical use and workability to exhibit substantially the same advantages as those of the first embodiment as the original restoration operation of the rotary table 14 may be dispensed with. The other aspects of the second embodiment are the same as those of the first embodiment.

What is claimed is:

1. An NC machine tool, comprising:

an NC circular table body having a rotary table connected thereto;

an NC controller operatively connected to said NC circular table body;

an absolute type encoder which detects a position of said rotary table; and a backup battery for the absolute type encoder provided internal to said NC circular table body, wherein said backup battery enables storage of said detected position of said rotary table when said NC circular table body and said NC controller become disconnected.

2. The NC machine tool according to claim 1, wherein a connector detachably connects the absolute type encoder to the NC controller at the NC controller.

3. The NC machine tool according to claim 2, wherein the NC circular table body is detachable from the NC controller.

4. The NC machine tool according to claim 1, wherein the NC circular table body is detachable from the NC controller.

5. The NC machine tool of claim 1, wherein said backup battery further enables storage of an initial position of the rotary table when said NC circular table body and said NC controller become disconnected.

6. The NC machine tool of claim 1, wherein said absolute type encoder at least temporarily stores electrical energy when said backup battery becomes disconnected from said absolute type encoder to enable at least a last detected position of said rotary table to be stored.

7. An NC machine tool, comprising:

an NC circular table body having a rotary table connected thereto;

an NC controller operatively connected to sad NC circular table body;

an absolute type encoder which detects a position of said rotary table; and a backup battery for said encoder connected to a connector connected to said NC circular table body, wherein said backup battery enables storage of said detected position of said rotary table when said NC circular table body and said NC controller become disconnected.

8. The NC machine tool of claim 7, wherein said backup battery is located inside said NC circular table body.

9. The NC machine tool of claim 7, wherein said backup battery is located in a cable connected to said NC circular table body.

10. The NC machine tool of claim 7, wherein said backup battery is located in a connector connected to said NC circular table body.

11. An NC machine tool, comprising:

an NC circular table body having a rotary table connected thereto;

an NC controller operatively connected to said NC circular table body;

an absolute type encoder which detects a position of said rotary table;

a backup battery connected to said absolute type encoder, wherein the NC controller and a cable connected to the NC circular table body are detachable from each other, said backup battery for said absolute type encoder being connected to a connector connected to said NC circular table body, wherein an electric supply from the backup battery to said absolute type encoder is not interrupted by a separation between the NC controller and the rotary table connected to the NC circular table body.

12. The NC machine tool of claim 11, wherein said backup battery is located in a connector connected to said NC circular table body.

13. The NC machine tool of claim 11, wherein said absolute type encoder at least temporarily stores electrical energy when said backup battery becomes disconnected from said absolute type encoder enabling at least a last detected position of said rotary table to be stored.

14. An NC machine tool comprising:

an NC controller for performing a positional detection by an absolute type encoder;

an NC circular table to which a cable for connecting the NC controller and an NC circular table body with each other is detachable, and a backup battery device provided with a backup battery connected to said NC circular table body for feeding electricity to the absolute type encoder of said NC circular table body when said cable that connects the NC controller and the NC circular table body with each other is removed.

15. The NC machine tool according to claim 14, wherein the backup battery device is connected to at least one of a connector for connection with the cable provided to the NC circular table body, and a connector of the cable connected to the NC circular table body.

* * * * *

UNITED STATES PATENT AND TRADEMARK OFFICE
CERTIFICATE OF CORRECTION

PATENT NO. : 6,651,534 B1
DATED : November 25, 2003
INVENTOR(S) : Kazuo Sakamaki et al.

Figure 5A:
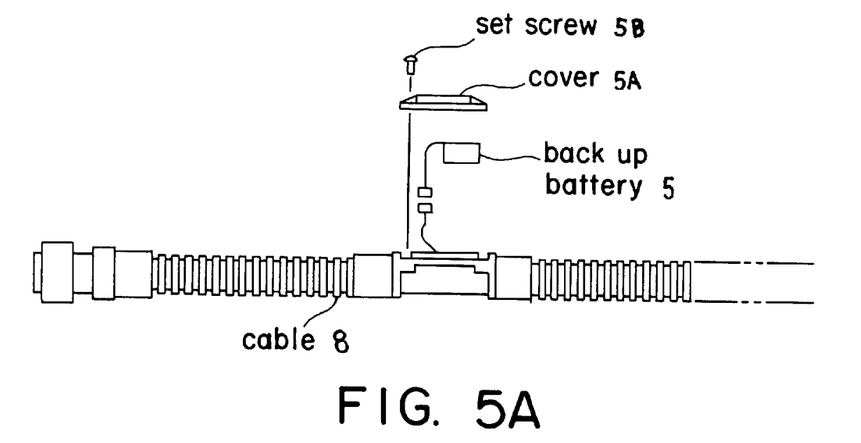
Figure 5B:
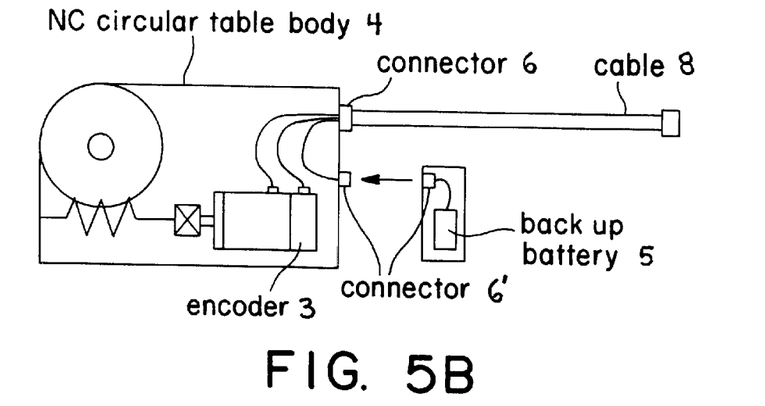

It is certified that error appears in the above-identified patent and that said Letters Patent is hereby corrected as shown below:

Column 3,
BRIEF DESCRIPTION OF THE DRAWINGS, after line 25, just before the heading "DESCRIPTION OF THE PREFERRED EMBODIMENTS", insert the following two new paragraphs:

-- FIG. 5A is an illustration of a backup battery provided outside of a cable.
FIG. 5B is an illustration of a backup battery provided outside of a connector. --

Signed and Sealed this

Twenty-fourth Day of August, 2004

JON W. DUDAS
*Director of the United States Patent and Trademark Office*